(12) United States Patent
Nguyen (10) Patent No.: US 10,843,794 B2
(45) Date of Patent: Nov. 24, 2020

(54) ELECTRIC MOTOR-DRIVEN COMPOUND AIRCRAFT

(71) Applicant: Vinh Nguyen, San Jose, CA (US)

(72) Inventor: Vinh Nguyen, San Jose, CA (US)

( * ) Notice: Subject to any disclaimer, the term of this patent is extended or adjusted under 35 U.S.C. 154(b) by 179 days.

(21) Appl. No.: 15/803,633

(22) Filed: Nov. 3, 2017

(65) Prior Publication Data

US 2019/0023385 A1 Jan. 24, 2019

Related U.S. Application Data

(60) Provisional application No. 62/418,379, filed on Nov. 7, 2016.

(51) Int. Cl.

| | | |
|---|---|---|
| *B64C 27/26* | (2006.01) | |
| *B64C 29/00* | (2006.01) | |
| *B64D 27/24* | (2006.01) | |
| *B64C 27/16* | (2006.01) | |
| *B64C 27/24* | (2006.01) | |
| *B64C 27/82* | (2006.01) | |
| *B64D 31/00* | (2006.01) | |
| *G05D 1/04* | (2006.01) | |
| *G05D 1/00* | (2006.01) | |

(52) U.S. Cl.
CPC .............. *B64C 27/26* (2013.01); *B64C 27/16* (2013.01); *B64C 27/24* (2013.01); *B64C 29/0025* (2013.01); *B64D 27/24* (2013.01); *B64D 31/00* (2013.01); *G05D 1/0088* (2013.01); *G05D 1/042* (2013.01); *B64C 2027/8236* (2013.01)

(58) Field of Classification Search
CPC ......... B64C 27/14; B64C 27/16; B64C 27/24; B64C 27/52
See application file for complete search history.

(56) References Cited

U.S. PATENT DOCUMENTS

| | | | | |
|---|---|---|---|---|
| 4,136,845 A * | 1/1979 | Eickmann | ............... | B64C 11/28 244/12.4 |
| 4,702,437 A * | 10/1987 | Stearns, Jr. | ............. | B64C 27/52 244/17.11 |
| 5,405,104 A * | 4/1995 | Pande | ..................... | B64C 27/24 244/17.25 |
| 6,460,802 B1 * | 10/2002 | Norris | ..................... | B64C 27/10 244/17.11 |
| 7,275,711 B1 * | 10/2007 | Flanigan | ................. | B64C 27/18 244/17.11 |
| 2010/0001120 A1 * | 1/2010 | Sun | ........................ | B64C 27/26 244/6 |
| 2010/0230547 A1 * | 9/2010 | Tayman | .................. | B64C 27/24 244/7 C |

(Continued)

*Primary Examiner* — Timothy D Collins
*Assistant Examiner* — Tye William Abell (57) ABSTRACT

An electric compound aircraft is disclosed with a capability of making vertical takeoff and landing and forward flight. In a specific embodiment, the compound aircraft includes an electric motor-powered tip-jet-driven rotary wing, an electric motor-powered tip-jet-driven propeller. The rotary wing provides lift for vertical takeoff and landing, hovering capability and during flight. The propeller provides thrust for forward flight. A fixed wing can be used, in addition to the rotary wing to provide lift for forward flight. Various electric control devices are used to provide control and stability for the compound aircraft and automation.

8 Claims, 8 Drawing Sheets

(56) References Cited

U.S. PATENT DOCUMENTS

| | | | | |
|---|---|---|---|---|
| 2014/0091172 A1* | 4/2014 | Arlton | ................ | B64C 27/14 |
| | | | | 244/17.23 |
| 2014/0356174 A1* | 12/2014 | Wang | ................ | B64C 39/024 |
| | | | | 416/204 R |
| 2016/0046369 A1* | 2/2016 | Watkins | ................ | B64C 5/02 |
| | | | | 244/7 A |
| 2017/0233067 A1* | 8/2017 | Eller | ................ | B64C 27/10 |
| | | | | 701/3 |

* cited by examiner

ELECTRIC MOTOR-DRIVEN COMPOUND AIRCRAFT

This application claims priority to Provisional Application Ser. 62/418,379, the content of which is incorporated by reference.

BACKGROUND OF THE INVENTION

The present invention relates to a motor-powered jet driven compound aircraft.

The airplane space is due for a major innovation since Sikorski improved the helicopter with a tail rotor which was happened in 1939. There has been attempt to combine airplane and helicopter capability to create a VTOL and forward flight aircraft without shaft-driven rotors, but none has been successful.

Airplanes have been providing a good transportation tool, but they are expensive and inconvenient. Helicopters have been providing a limited transportation, but they are bulky, expensive, heavy, and unsafe to become efficient in commuting. Airplanes can take off, but need a long runway; hence they are neither practical nor convenient for commuting. Helicopters on the other hand, can take off vertically without a runway, but they are bulky, costly to own and dangerous to operate.

U.S. Pat. No. 7,275,711 proposed a gas-powered helicopter with a gas-generated jet placed at the tips of rotary wings and a fixed wing like an airplane. This configuration combines the VTOL feature of helicopter and forward flight of airplane. However, it is very noisy because the tip jets are driven by gas and gas escape is noisy. The noise level was at 116 dB in the cockpit; this is equivalent to a noise generated by a chain saw. The noise is even higher on the ground. At ½ mile away, the noise level was 90 dB which is equivalent to a noise generated by a motorcycle.

An electric drone with electric motors at four corners solves the noise issue of the gas-powered tip-jet-driven helicopter, but runs into controlling and balancing problems. It requires the all 4 motors at 4 corners must always generated the exact amount of thrust at any moment. If one of the motors produces less than the other 3 motors or even one of motor's blades is not working, the drone is out of control and a fatal crash may follow.

SUMMARY OF THE INVENTION

An electric compound aircraft is disclosed with a capability of making vertical takeoff and landing and forward flight. In a specific embodiment, the compound aircraft includes an electric motor-powered tip-jet-driven rotary wing, an electric motor-powered tip-jet-driven propeller. The rotary wing provides lift for vertical takeoff and landing, hovering capability and during flight. The propeller provides thrust for forward flight. A fixed wing can be used, in addition to the rotary wing to provide lift for forward flight. Various electric control devices are used to provide control and stability for the compound aircraft.

The compound aircraft in the preferred embodiment uses all electric components from battery to wires, motors to control devices. It does not require shaft-driven rotors nor gas-powered motors to produce power to lift the aircraft up vertically or forward flight.

The compound aircraft in the preferred embodiment does not use gas-powered tip jet-driven rotors to power its rotary wings, but instead it uses electric motors placed on its rotary wings, preferably at the tip to drive the rotary wings and hence providing enough thrust to overcome the compound aircraft's weight to take off and land vertically. Similar configuration is applied to the propeller to drive the aircraft forward flight. The aircraft still uses a fixed wing, but small to assist the forward flight and this allows the rotary wings to turn to autorotation, without consuming electric power and hence saving the battery life.

With the electric motor placed at the tip jet of the rotary wings or the propellers, the preferred embodiment can provide high thrust augmentation ratios. High thrust augmentation ratios are critical in vertical takeoff and landing because the aircraft in the preferred embodiment will have light weight components, yet providing powerful thrust.

The invention represents a compound aircraft that is lighter in weight, quieter, cleaner and easier to configure than is presently known in the art. The compound aircraft in the preferred embodiment is convenient with VTOL capability like a helicopter, yet it can fly forward effortlessly like an airplane. It's a light, inexpensive and safe vehicle for commuting.

The preferred embodiment is to teach how to build an VTOL compound aircraft by eliminating shaft-driven rotors. Shaft-driven rotor will generate torque in the opposite direction of shaft's turn. Torque generated creates instability and vibration to the aircraft's fuselage and requires a counter-torque tail rotor and a transmission to tail rotor.

The preferred embodiment eliminates the shaft-driven rotors by installing electric motors at the tip of rotary wing. Electric motors are powerful with large thrust output and little electrical energy provided. Through electric wire, electrical energy is supplied to the electric motors easily and conveniently. Rotary wing is then spun, generating thrust to overcome the aircraft's weight and provide vertical takeoff and landing without generating torque.

Without a tail rotor to counter the torque, the compound aircraft in the preferred embodiment has room to be equipped with a propeller to propel the aircraft in forward flight. The propeller has the same configuration as the rotary wing and is powered with electric motors installed at the tip of the propeller's blade.

The preferred embodiment in the preferred embodiment can be controlled by a pilot on board or automated or pilot-less and used as an aircraft taxi to transport passengers. The automation is done since all electric devices from electric motors, to electric sensor, transmitter, receiver can be commanded by electric signals with electric wire or wireless.

The unexpected advantages of the compound aircraft in the preferred embodiment:
1. Hovering
2. Returning home. Home is a preset location.
3. Flying in preset path to destination.
4. Battery can be monitored, replaced or swapped or recharged.
5. High thrust augmentation
6. Light weight
7. Clean air or no air pollution
8. Quiet
9. Low maintenance
10. Easy to control
11. Easy to reconfigure
12. No tail rotor
13. Can perform vertical takeoff, landing, forward flight & hovering
14. Safe, reliable and dependable
15. Low vibration
16. Low cost and low operating expenses
17. Easy to fly or fully automated.

The configuration of the compound aircraft in the preferred embodiment is not limiting to specifics mentioned. Many variations are available. For example, there could be two rotary wings in coaxial configuration spinning opposite directions. The propeller is configured as mentioned or is used by an electric fan. The rotary wing could be used for VTOL and tilted to the front and acts as a propeller for forward flight; in this case, no propeller is needed.

The compound aircraft in the preferred embodiment can replace the current heavy, expensive and unsafe helicopter. The compound aircraft in the preferred embodiment can replace the gas-gazing and environment-polluting automobile for short distance commuting.

The compound aircraft in the preferred embodiment has combined different outstanding technologies in an innovative way and created an aircraft with unexpected and effective results, providing an excellent transportation for generations to come.

BRIEF DESCRIPTION OF THE DRAWINGS

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

DETAILED DESCRIPTION

The preferred embodiment teaches how to apply the principle of thrust augmentation to increase thrust generation where a large amount of thrust is generated with a small amount of energy input. And jet-driven rotary wing or propeller is an embodiment of the instant thrust augmentation.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
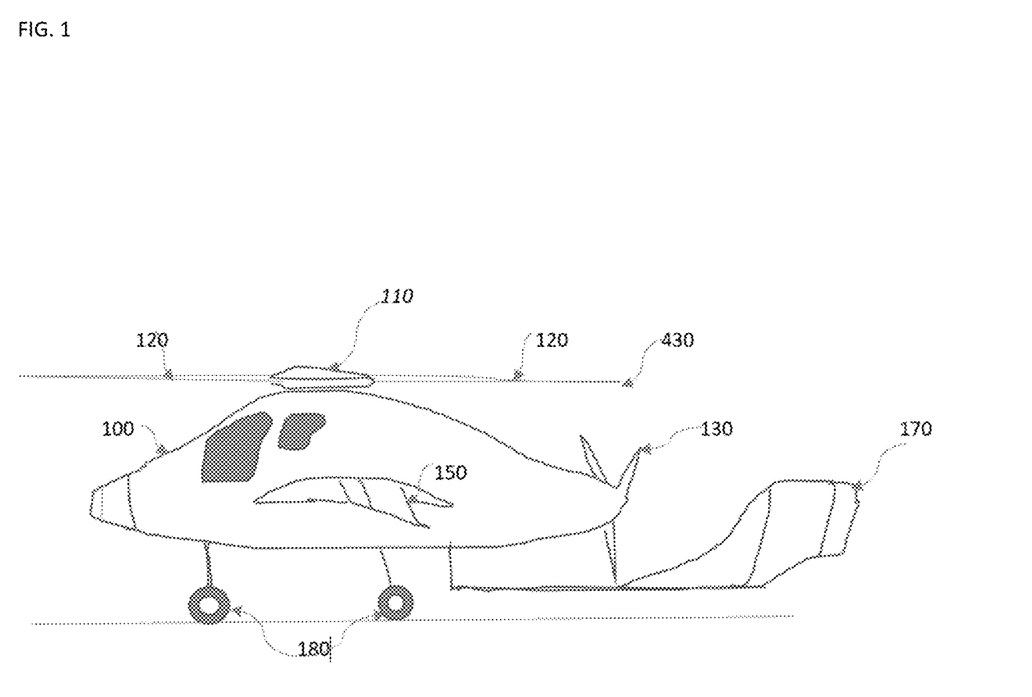
FIG. 1 shows an exemplary side view of a compound aircraft in accordance to the invention.

Thus, in accordance with various embodiments, computationally implemented methods, systems, circuitry, articles of manufacture, ordered chains of matter, and computer program products are designed to, among other things, provide one or more flight devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements.

The preferred embodiment uses electric motors with small amount of energy input from an electric battery to drive a rotary wing and generate enough thrust to lift a heavy aircraft up. Electric motors are installed vertically anywhere on the blade of the horizontal rotary wing; however, preferably place the electric motors near the tip of the horizontal rotary wing's blade to maximize the thrust augmentation. Once the electric motors start to spin, they drive the rotary wing to spin horizontally. Once the rotary wing spins, it generates thrust to lift the aircraft up.

The faster the rotary wing spins, the more lifting thrust is provided to the aircraft. The velocity is proportional to the force acting on the electric motors, proportional to the radius of the rotary wing or its blades and disproportional to the weight of the electric motors. To obtain the maximum velocity, the electric motors are placed at or near the tip of the blades. Furthermore, since the velocity is disproportional to the mass of all objects placed on the blade, including the blade itself, only the necessary components are placed at the blade's tips and the blade itself should be light in weight.

Figure 2:
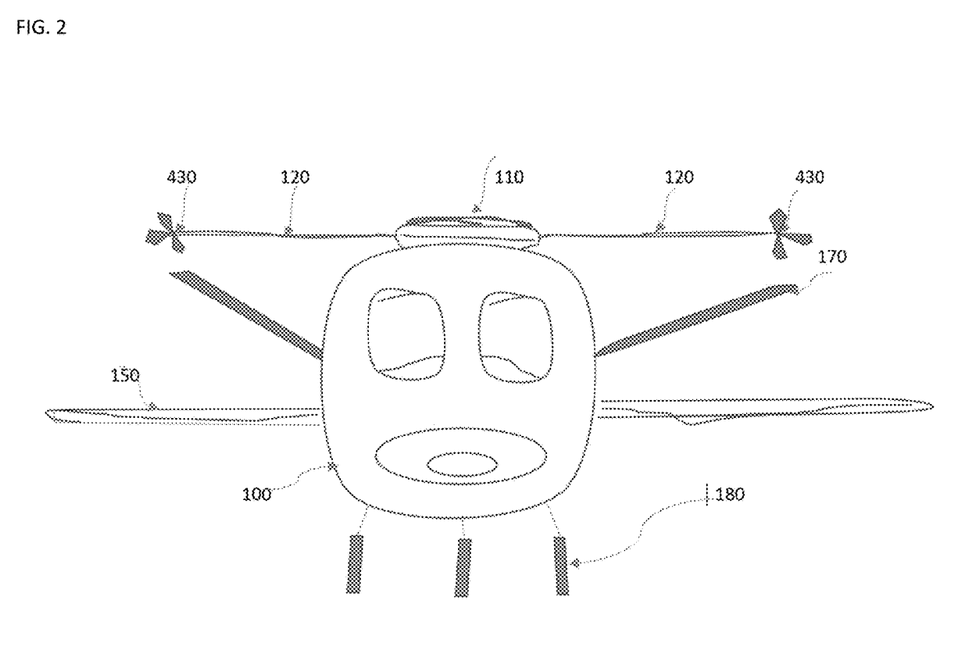
FIG. 2 is shows an exemplary front view of the compound aircraft of FIG. 1.
Figure 3:
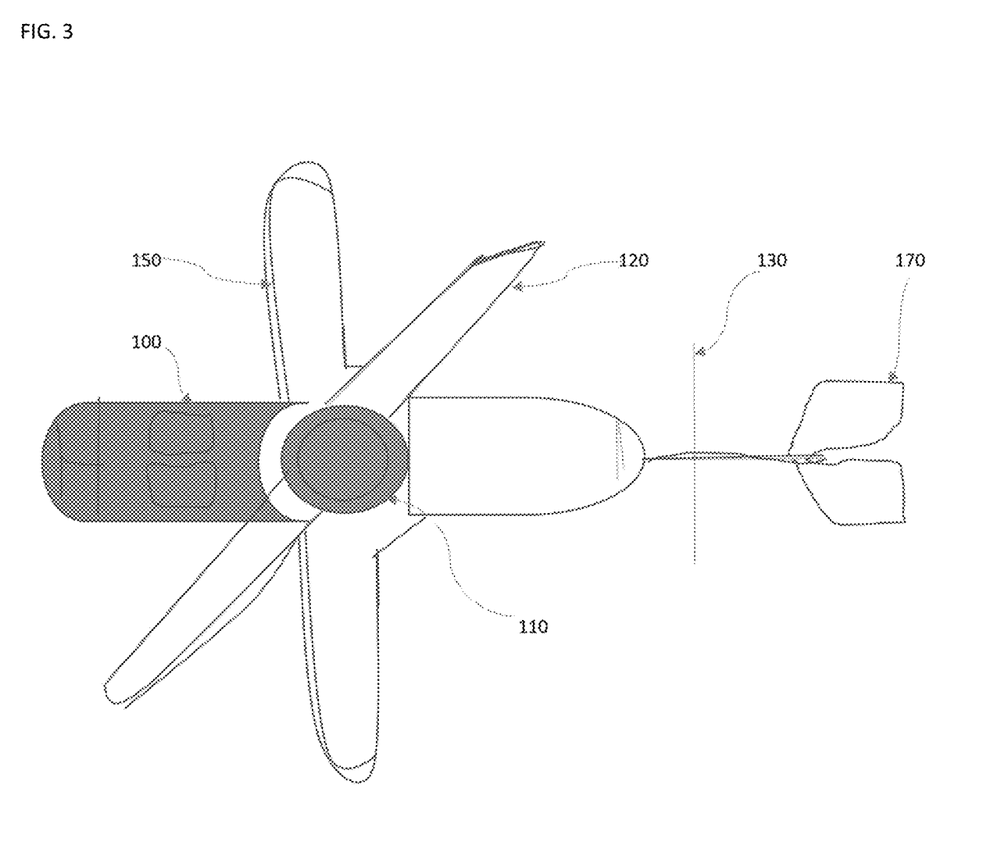
FIG. 3 shows an exemplary top view of the compound aircraft of FIG. 1.

FIGS. 1-3 depict an exemplary compound aircraft in accordance to one embodiment of the invention. On top of the fuselage 100 is the rotary wing 110 connected with one or more blades 120. One or more electric motors 430 are connected to the tip of the blades. The rotary wing assists the compound aircraft in vertical takeoff, landing and hovering.

Similarly, a propeller 130 is connected to the compound aircraft either in its front or in its back of the fuselage. The propeller could have the same construction as the rotary wing. The propeller is used to propel the compound forward in flight.

During operation, the compound aircraft FIG. 1 performs vertical takeoff in the preferred embodiment. By increasing the throttle, the pilot directs the transmitter 740 located at the cockpit to communicate with the control interface located at the center of the rotary wing 110. Once the receiver 750 receives a signal from the transmitter 740, it gives a command to the electronic speed control (ESC) 730, allowing electric energy to flow into the electric motor 430 from the electric battery 710 to cause the electric motors 430 on the blades 120 to spin. The electric energy stored in the battery 710 is now converted to kinetic energy. The electric motors 430 then push the air behind and move in a circular motion. Since the electric motors 430 located at the tip of rotary wing's 110 blades 120, the blades 120 then start to move horizontally, parallel with the ground; this drives the rotary wing 110 to spin.

Keep increasing the throttle and adjusting the pitch of the rotary wing's 110 blades 120, the rotary wing 110 will spin faster. Once the thrust generated by the rotary-wing 110 overcomes the weight of the aircraft FIG. 1, the aircraft FIG. 1 will start to airborne or take off vertically.

This is how the compound aircraft FIG. 1 perform forward flight. The propeller 130 has the same structure and working mechanism as the rotary wing 110. The propeller 130 has the electric motors 430 located at the tip of the propeller's 130 blades. With the fixed wing 150, the propeller 130 is used to push the compound aircraft forward.

After reaching an altitude of 50 to 100 feet, by increasing the throttle for the propeller 130, the electric motors 430 located at the tip of the propeller's blades start to spin, causing the propeller's blades to turn and the aircraft FIG. 1 begins the forward flight. After reaching a desirable altitude, the electric motors 430 of the rotary wing 110 are turn off by decreasing the throttle of the rotary wing 110 to zero. The rotary wing 110 now is unpowered, free rotating. The aircraft FIG. 1 is now operating like a regular fixed wing airplane. The propeller 130 is also used to control yaw, simplifying the controlling aspect of the aircraft. By using a small fixed wing 150, this embodiment allows the electric motors of the rotary wing 110 turned off during forward flight, not only saving battery energy but also disengaging the rotary wing, letting the rotary wing become autorotating; hence it does not have the advancing blade velocity problem and treating blade stall problem.

Furthermore, the electric motor can be folded and retracted into the blades of the rotary wing during autorotation. This capability helps in reducing drag. Also during rotation, the electric motor can be slidden toward the center of the rotary wing to lighten the weight at the blade's tip and help further reducing drag.

Without using noisy and bulky engines, in addition to being light-weighed and producing no air pollution, the compound aircraft in the preferred embodiment is relatively quiet. The compound aircraft produces no air pollution with the use of electric motors, batteries and other electronic control and sensor devices. The embodiment uses no engine and no transmission; instead it uses electronic motors, batteries and various light-weight electronic control devices. Therefore, it is light-weighted. Also without using engines and transmission, the preferred embodiment is not prone for engine failure and not required much maintenance.

With the use of electronic motors, battery, electronic control devices and sensors, the compound aircraft is easy to control and easy to reconfigure to suit the current environment. Also with all electronic devices, parts in this compound aircraft are easy to replace if needed. Batteries 710 are rechargeable or replaceable for continuous flight.

Next, the steps where the compound aircraft performs vertical landing are detailed. Once reaching the destination, the pilot can prepare for vertical landing by decreasing the throttle of the propeller to zero to stop the propeller 130 from spinning and simultaneously starting to increase the throttle of the rotary wing 110 to turn on the electric motors 430 of the rotary wing 110 and cause the rotary wing 110 to spin. The pilot can adjust the pitch of rotary wing's blades to gain stability. At the same time the pilot releases the landing gear to prepare for landing. The pilot adjusts the throttle of the rotary wing 110 to control the lowering of the aircraft FIG. 1. Once touching the ground, the pilot can decrease the throttle of the rotary wing to the speed of zero and completes the flight.

Batteries 710 are used to provide electric power to the electric motors via electric wire 120, control interface and various electric devices. Batteries can be located at the central place at the cockpit or near the electric motors.

If one of the electric motors 430 on the rotary wing 110 is not working, the rotary wing 110 still spins, but with less intensity. The same is true for the propeller 130. If one of the electric motors 430 on the propeller 130 is not working, the propeller 130 still spins, but with less intensity. Furthermore, for the rotary wing 110, if the battery 710 is dead or all the electric motors 430 are not working, the rotary wing still spins, coupled with the fixed wing 150, still providing lift temporarily for the aircraft FIG. 1.

The compound aircraft FIG. 1 is not limited to one rotary wing 110. It can have more than one rotary wings 110 placed one on top of the other as in coaxial configuration. Also, it can have more than one propellers 130 located side-by-side. The rotary wing 110 or the propeller 130 can have more than 2 blades 120. The spinning direction of the rotary wing 110 or the propeller 130 could be either counterclockwise or clockwise.

With electric motor-powered tip-jet driven rotary wing and propeller, the compound aircraft in the preferred embodiment offers more efficiency than conventional airplane or helicopter because electric motor-powered tip-jet driven rotary wing provides thrust augmentation.

There are 2 small fixed wings 150 connected on 2 sides of the fuselage. On the wings, there are the ailerons and flaps. Rudders and elevators are connected to the back of the fuselage. Ailerons, rudders 170 and elevators help the compound aircraft rolling, turning or pitching, respectively. Landing gears 180 are used to help the compound aircraft in landing.

Figure 4:
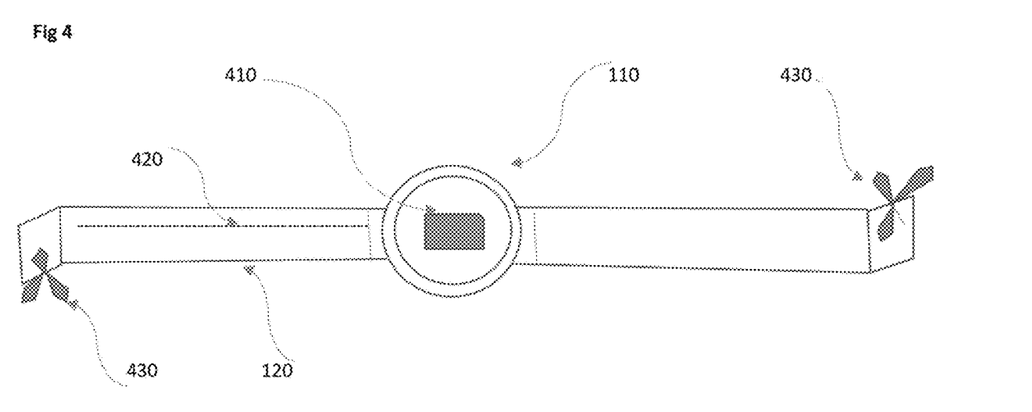
FIG. 4 shows an exemplary top view of the rotary wing of the compound aircraft of FIG. 1.

FIG. 4 shows a detailed drawing of the rotary wing. Besides the electric motors are attached to the tip of the blades, there are battery and control interface 410 located at the center of the rotary wing. Battery and control interface could be located at the central system in the aircraft. Wiring 420 hidden inside the blades is used to provide electric power to the electric motors.

Figure 5:
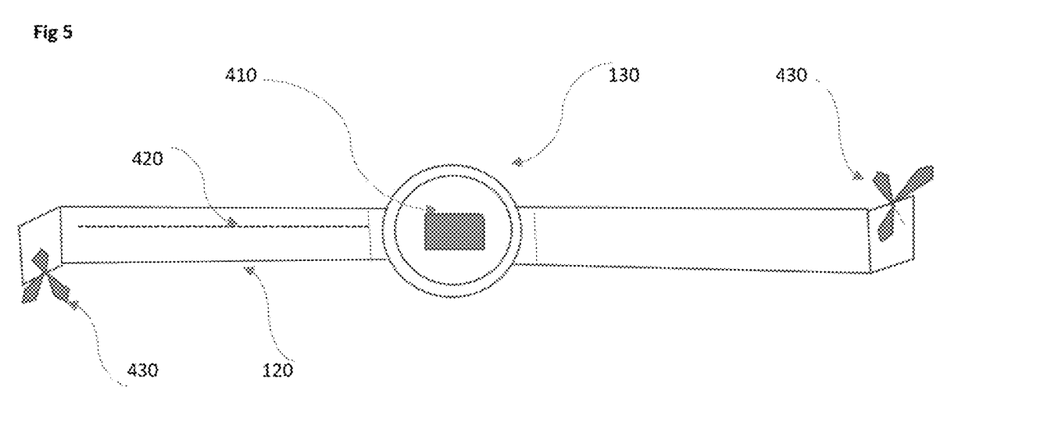
FIG. 5 shows an exemplary front view of the propeller of the compound aircraft of FIG. 1.
Figure 6:
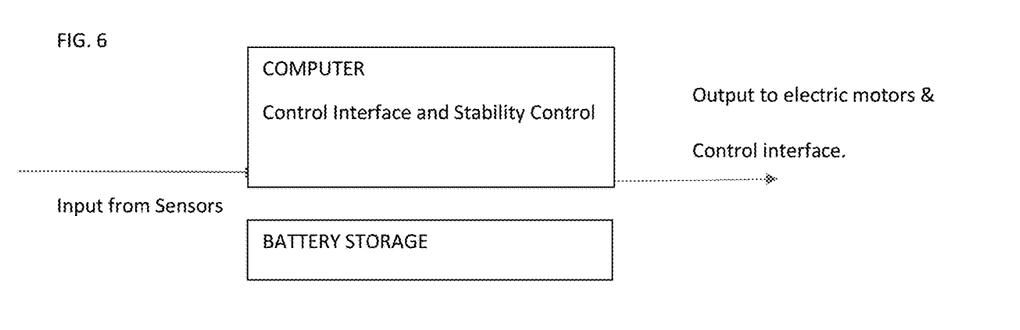
FIG. 6 is shows an exemplary block diagram of controlling and stabilizing the compound aircraft of FIG. 1.

FIG. 5 is the detailed drawing of the propeller. The propeller has the same structure and working mechanism as the rotary wing, while FIG. 6 shows a computer for controlling and stabilizing the compound aircraft.

Figure 7:
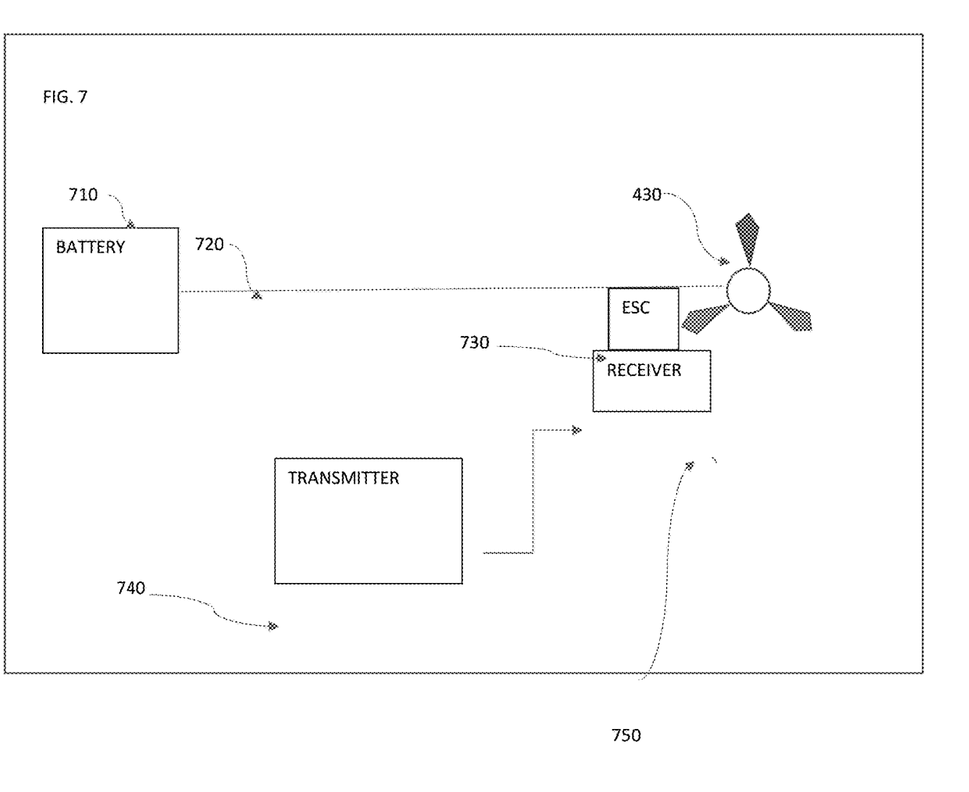
FIG. 7 shows an exemplary block diagram of electronic communication between electric devices of FIG. 1.
Figure 8:
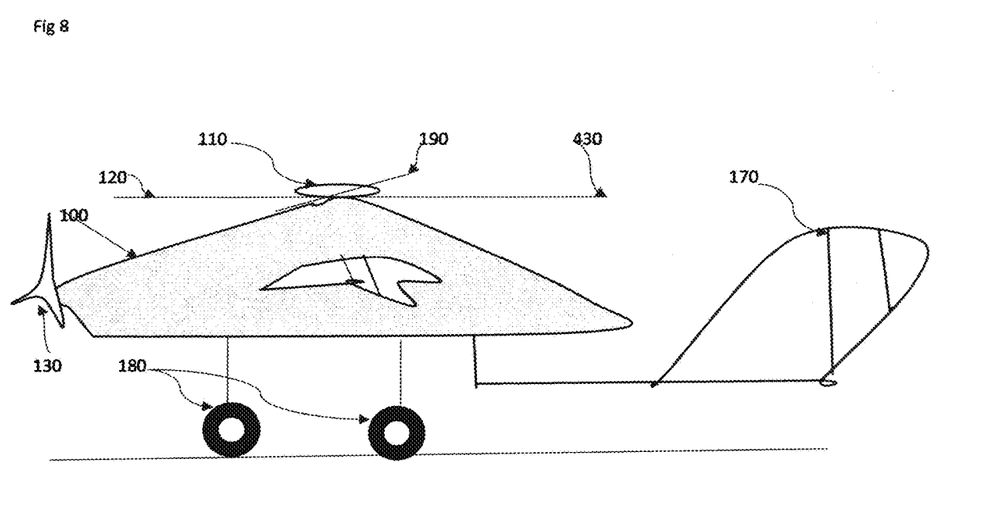
FIG. 8 shows an exemplary side view of another compound aircraft in accordance with the invention.

FIG. 7 is the block diagram of electronic communication between the battery 710, the transmitter 740, the receiver 750, electronic speed controller (ESC) 730 and the electric motor 430.

Using a real experimental data, an aircraft with weight of 23.4lbs and carrying a load of 50lbs is lifted with 4.89lbs of thrust. Thus, the thrust augmentation ratio is about 15.

The preferred embodiment provides a method that the electric motor-powered tip-jet-driven compound aircraft can be built with high performance, high economics and no torque. The compound aircraft has no need for a heavy, expensive, gas consuming turbine because it uses all electric components; hence the weight of the aircraft is reduced substantially. Since the compound aircraft is not shaft-driven engine, there is no torque generated which turns the aircraft around its shaft in the opposite direction of the rotor. Hence, there is no need for an anti-torque rotor at the tail to counter-react to this torque to maintain the stability of the aircraft and since there is no tail rotor, the aircraft's length is reduced substantially contributing the aircraft weight reduction. Furthermore, since there is no torque generated, the blade roots are smaller and lighter.

Because of no torque generated, no tail rotor and no transmission needed to control the tail rotor, the unexpected result is that the preferred embodiment has room for installing a propeller to propel the preferred embodiment for forward flight and without interfering with the torque countering. There are a lot of dreaming expressed in writing about this combination feature of VTOL and forward flight; however, until now, there is a little success in delivering such practical aircrafts. The result is that the preferred embodiment has both VTOL capacity and forward flight combined harmoniously in an unforeseen way. The rotary wing provides the VTOL capacity and the propeller propel the preferred embodiment in forward flight.

Another advantage of the preferred embodiment is to provide the mechanically simple compound aircraft. The compound aircraft in the preferred embodiment has no gas-burning combustion engine, no complex transmission system to control various mechanical parts in the aircraft, no gearbox reduction, no connecting drive shaft, no main reduction rotor gear and takeoff, no tail reduction gear and takeoff, no tail rotor shaft and gear box, and no previously mentioned tail rotor. Instead, the compound aircraft in the preferred embodiment has electric battery as an engine to provide electric energy, electrical motor driven rotary wing, electric motor-driven propeller, and electric control devices. This simple mechanics helps to reduce maintenance substantially, decrease aircraft's weight and increase aircraft's reliability and dependability and help cost saving in building the aircraft.

Another object of the preferred embodiment is to teach a method to build the compound aircraft that is easy to fly. The rotary wing of the compound aircraft is used exclusively for vertical takeoff and landing and the propeller of the aircraft is used forward flight and yaw. This configuration arraignment helps reduce the impact of rotary wing and propeller on the fuselage and improve aircraft's stability. All other electric control device is automatic or overridden by pilot. Therefore, the compound aircraft can be automated and easy to fly. This capacity demands less on pilot's skills and flying experience, resulting in more productive and less training time. Eventually this capacity could lead to pilot-less aircraft and the compound aircraft could be behaved more like a taxi in which it is used to transport passengers.

Another advantage of the preferred embodiment is that the compound aircraft has a reliable and dependable vertical takeoff and landing (VTOL) performance. Since the rotary wing is used exclusively for vertical takeoff and landing and it's very stable for a variety of RPM (revolution per minute), this capacity helps the aircraft in maneuverability. The pilot can command the aircraft for quick vertical climb as for vertical takeoff and obstacle avoidance. Moreover, this capacity can be exploited in vertical landing for quick and precise location. Furthermore, it can be used in hovering and overweight situation.

Another advantage of the preferred embodiment is that the compound aircraft has low noise. This feature is important in urban and suburban commuting and congestion. Certainly, this feature is also critical to avoid being detected as in police detective operation. The low noise level can be achieved because of electric battery, electric motors and other electric devices being used and because of no shaft-driven rotor nor gas combustion parts being used in the compound aircraft. Also because of no shaft-driven rotor being used, the blade slapping sound is reduced to minimum. Furthermore, there is no noise from the tail rotor and transmission because they are not used in the compound aircraft.

Another advantage of the preferred embodiment is that the compound aircraft is very safe and dependable. This is because the compound aircraft has no torque and no counter-torque tail rotor; therefore, it's very stable. Furthermore, the compound aircraft is stable for a variety of RPM as mentioned, coupled with relatively low number of parts on the aircraft due to using exclusively electrical part. These features reduce reliance on pilot's skills and experience and training. All the mentioned features inherently exhibit a great degree of safety for the compound aircraft, reducing accidents, avoiding pilot's errors and saving life of both pilots and passengers.

Another advantage of the preferred embodiment is that the compound aircraft is relative low cost and low operating expense. Since there are no expensive shaft-driven rotors, no costly gas combustion parts coupled with low number of inexpensive electric parts, the cost of the aircraft is reduced substantially. Furthermore, electric parts are not needed overhaul or tuned up like gas usage parts, the operating expense for the compound is relatively low.

Another object of the preferred embodiment is to provide more stability in handling the aircraft, particularly during vertical takeoff and landing than any other VTOL known configuration. This is because, instead having four smaller horizontal rotary wings like in a drone and if one of the wings is out of sync with the rest, the drone will be imbalanced and crashes, the aircraft in the preferred embodiment uses one central big horizontal rotary wing driven by vertically positioned electric motors placed the tip of the rotary wing. If one of the electric motors is out of sync with the others, the aircraft in the preferred embodiment still can fly because its central rotary wing still spins and provides lifting thrust.

Another object of the preferred embodiment is to illustrate a compound aircraft which is much quieter, much lighter in weight, no pollution to the air quality, much easier to reconfigure and control than is presently known in the art.

The present embodiment uses electric battery to replace the bulky, noisy and heavy gas engine in the previous art. Electric battery is much lighter, much smaller in size, no noise generated, easier to control and reconfigure and produces no pollution to the air. Another big advantage of implementing electric battery is the takeoff load is the same as the landing load because there is no fuel consumption during takeoff, landing and forward flight. In electric battery, only chemical interaction to provide electric energy to the aircraft and the weight of the chemicals is unchanged; hence the weight of the battery which acts like a container to house the chemicals inside stays the same during the duration of takeoff, landing and forward flight. The battery can be replaced or recharged to extend flight time. Since the aircraft has VTOL capability, it can conveniently stop anywhere or at a charging station to replace or recharge the battery and continue the journey.

Another advantage of using electric battery instead of gas-powered engine is electric energy is easily diverted and shared to different destination devices. For instance, during vertical takeoff, all electric energy from electric battery is used for powering the rotary wings to lift the aircraft up, overcoming gravity. After the vertical takeoff gains momentum, some of electric power is diverted and shared with the propeller for forward flight. During forward flight, the electric energy is used for forward flight exclusively since the rotary wing is left for autorotation, saving electric energy. The same principle is applied for landing. In preparing for landing, the electric energy is shared between the propeller for forward flight and the rotary wing. Once the landing site is selected, the electric energy is used solely for the rotary wing to lower the aircraft to ground.

One unexpected outcome of the preferred embodiment in this invention is to achieve automation. Once the electric motor is able to replace the mechanical main rotor system, a domino effect takes place: the electric battery, providing electric energy to the electric motors, replaces the gas-burning engine, the electric wire, conducting electric energy to various electric components on board, replaces the mechanical transmission, and the electric control devices, controlling various electric parts, replace the gearbox. There is no tail rotor system in the preferred embodiment of this invention. Subsequently, the preferred embodiment in this invention has all electric devices. Electric devices can be manually controlled or automatically controlled by software implemented on microprocessor on board.

Furthermore, the electric motor driven rotary wing in this invention acts like an external, independent force to the fuselage. In addition, there is no transmission to the rotary wing as well as to tail rotor system which is not needed in the preferred embodiment. Therefore, the controlling or automation gets even simpler for the preferred embodiment.

The automation feature is further enhanced with electric control devices, electric sensors, GPS—global positioning system and WIFI on board—a wireless connection to another network using radio waves without a physical wire. Electric sensors utilized on the aircraft detect and avoid obstacles or objects like trees, electric wire on the ground, buildings, or even other aircrafts. The electric sensors can sense the wind and wind direction and adjust the speed or altitude of the aircraft. GPS is used to provide a path to destination for the aircraft. With electric control devices like computer chips, the aircraft can be preprogrammed with takeoff, forward flight, landing without a licensed pilot and it becomes a pilot-less transportation aircraft. The compound aircraft can be overridden or controlled by a pilot on board.

One big advantage of automation for the preferred embodiment is to preset a flight path for destination. The aircraft can fly from a location to a designated destination without further control by a pilot. The aircraft can automatically return home after delivering or arriving at the designated location. As a result, the aircraft can transport passengers, deliver packages, medical supply, foods, grocery and many other things without a pilot on the aircraft. Further reduce some fatal human errors created by pilot.

Another advantage of the preferred embodiment is the compound aircraft uses all electric components, including electric controller or transmitter, electric receiver, electronic speed controller (ESC), electric sensors, electric battery monitor, and electric GPS (global positioning system), further exploiting automation capability. The transmitter or also is called the controller is used to control the electric devices of the compound aircraft. It can send signals or commands to the electric receiver remotely and can be placed on the aircraft or at a short distance. Once the electric receiver receives signals or commands from the transmitter, it sends those signals to other electric devices like the ESC or electric sensors. The ESC is mainly used to control the speed and direction of the electric motors.

One unexpected result of the preferred embodiment is that automation helps each compound aircraft fly at different altitude for each direction. For example, one aircraft on southwest direction flies at 1000 feet versus another aircraft on northwest flies at 1500 feet and so on. Automation for the preferred embodiment is easier than that of automobile because the compound aircraft in this invention can fly at different altitude each direction, not limited to a fixed zero elevation like cars. Because of VTOL capability, the preferred embodiment can land and take off at anywhere, not necessary at a congested airport, further reducing collision.

The electric sensors are placed throughout the aircraft to monitor the activity of the aircraft, enhancing the automation. The most typical sensors are gyroscope which measures the rotation or twist of the aircraft, the barometer which is used to measure the air pressure and then the altitude above the sea level, the accelerometer which measure the acceleration of the aircraft and the air speed sensor. More advanced sensors provide additional functionality to automate the aircraft's flying capability like the GPS receivers, magnetometer, optical flow sensors and air speed sensors. Additional sensors are used to detect and avoid obstacles. Computer vision and artificial intelligence (AI) can be deployed to help improve automation.

Automation is the key in providing safety to human both on the aircraft and on the ground. Failsafe setup is implemented on the preferred embodiment in this invention. Failsafe setup provides ways to determine what actions should be taken when certain functions do not meet the requirement or worse fail. For example, when the battery's energy drops below certain threshold minimum, the aircraft must find an appropriate location to land safely. Or when one of the electric motors gets weaker than other, then the other electric motor must adjust the strength to keep the aircraft in balance.

In the preferred embodiment, in delivering electric energy is delivered from the electric battery to electric motors placed at the tip of rotary wings or propeller and various electric components through the compound aircraft via electric wires. The electric wire that conducts electric energy to the electric motors must have enough capacity to carry enough current and voltage required to operate the electric motors properly, particularly during vertical takeoff and landing.

Also, the compound aircraft in the preferred embodiment uses electric battery, electric motors, and other electric control devices and does not use any gas-powered turbine, shaft-driven motor, its operation is very quiet. And no gas combustion engine is used in the compound aircraft in the invention, there is no pollution released into the atmosphere during the operation.

The advantage of using electric components is that they are very light weight, reliable, low cost and low maintenance in addition to automation. These electric components last a long time.

Another big advantage of this compound aircraft is that the aircraft needs only a smaller fixed wing than compared with conventional fixed-aircraft because the aircraft in the preferred embodiment does not use its fixed-wing for vertical takeoff and landing, instead using its rotary wing.

During forward flight, the rotary wings can be fully unloaded, become auto-rotary and slow down to minimize drag. The high advancing tip velocity and retreating blade stall problems are also avoided.

Furthermore, for forward flight, for the two-blade configuration the rotary wing can be converted to the fixed wing by flipping one of the blades around the horizontal axis. This capability can be achieved since the blade has elliptically symmetrical shape. In this case, no fixed wing is needed, further reducing weight on the aircraft.

Having both rotary wings and fixed wing on this compound in the preferred embodiment displays a comparative advantage in case of emergency. If the aircraft is run out of battery or in a worst scenario where all electric motors are stopped working, the aircraft still uses both its rotary wing which becomes autorotation and its fixed wing for emergency landing.

The preferred embodiment combines different technologies from different perspectives and creates a unique and unexpected outcome that has not been accomplished before. The present embodiment of a compound VTOL aircraft in the preferred embodiment will provide a new and effective solution in transportation.

One big advantage of the preferred embodiment is that the compound aircraft has no gas-powered engine, shaft-driven rotor, drive train parts so it does not need tune up, overhaul periodically. In other words, the compound aircraft needs little maintenance.

The compound aircraft in the preferred embodiment can replace the current heavy, expensive and unsafe helicopter. The compound aircraft in the preferred embodiment can replace the automobile for short distance commuting.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A flying vehicle, comprising:
   a fuselage;
   a rotary wing;
   one or more electric motors placed on the outer surfaces of the rotary wing;
   one or more fans placed on the rotary wing, and connected to the electric motors,
   a battery located in the fuselage for providing electric power;
   electrical wires for supplying electric power from the battery to the electric motors;
   wherein the rotary wing is coupled to the fuselage to provide lift for vertical takeoff and landing, hovering, and during flight.

2. The flying vehicle of claim 1, further comprising:
   a fixed wing coupled to the fuselage to provide lift for forward flight.

3. The flying vehicle of claim 1, wherein the propeller is coupled to the fuselage in the front or in the back of the fuselage.

4. The flying vehicle of claim 1, further comprising:
   a stabilizing bar.

5. The flying vehicle of claim 1, further comprising:
   two or more rotary wings.

6. The flying vehicle of claim 1, further comprising:
   two or more propellers.

7. The flying vehicle of claim 1, further comprising:
   a propeller, wherein the propeller is coupled to the fuselage to provide thrust for forward flight.

8. The flying vehicle of claim 7, further comprising:
   a fixed wing coupled to the fuselage to provide lift for forward flight.

* * * * *